United States Patent
Hammerl et al.

(10) Patent No.: US 7,370,540 B2
(45) Date of Patent: May 13, 2008

(54) ROTATION ANGLE SENSOR, IN PARTICULAR FOR AN ELECTRICAL STEERING SYSTEM OF AN INDUSTRIAL TRUCK

(75) Inventors: Robert Hammerl, Hohenthann (DE); Frank Manken, Henstedt-Ulzburg (DE); Christoph Weber, Henstedt-Ulzburg (DE)

(73) Assignee: Jungheinrich Aktiengesellschaft, Hamburg (DE)

( * ) Notice: Subject to any disclaimer, the term of this patent is extended or adjusted under 35 U.S.C. 154(b) by 27 days.

(21) Appl. No.: 11/444,694

(22) Filed: Jun. 1, 2006

(65) Prior Publication Data

US 2006/0283268 A1    Dec. 21, 2006

(30) Foreign Application Priority Data

Jun. 17, 2005   (DE) ..................... 10 2005 028 043

(51) Int. Cl.
*G01L 3/00* (2006.01)
*G01P 3/46* (2006.01)

(52) U.S. Cl. .................. 73/862.326; 324/174
(58) Field of Classification Search ........... 73/862.326; 324/207.11–207.19, 207.2, 207.21–207.26, 324/166–167, 173–174, 177

See application file for complete search history.

(56) References Cited

U.S. PATENT DOCUMENTS

| | | | | |
|---|---|---|---|---|
| 4,550,597 A | * | 11/1985 | Drutchas et al. | ............ 73/118.1 |
| 6,479,987 B1 | | 11/2002 | Marx et al. | ............... 324/207.2 |
| 2003/0184246 A1 | * | 10/2003 | Sardar et al. | ................ 318/369 |
| 2004/0164733 A1 | * | 8/2004 | Fukaya et al. | ......... 324/207.25 |
| 2007/0174015 A1 | * | 7/2007 | Steinlechner | ................. 702/94 |

FOREIGN PATENT DOCUMENTS

| | | |
|---|---|---|
| DE | 101 43 286 A1 | 4/2002 |
| DE | 101 12 352 A1 | 9/2002 |
| EP | 1096234 A1 * | 5/2001 |
| WO | 2005/050150 A1 | 6/2005 |

\* cited by examiner

*Primary Examiner*—Edward Lefkowitz
*Assistant Examiner*—Jonathan Dunlap
(74) *Attorney, Agent, or Firm*—Vidas, Arrett & Steinkraus, P.A.

(57) ABSTRACT

Rotation angle sensor, in particular for an electrical steering system of an industrial truck, in which two magnetic field sensitive sensor elements are arranged on orthogonal axes and a permanent magnet is attached to a shaft extending through the axis intersection point and the output signals X, Y of the sensor elements are given to an evaluation unit, which determines from the two output signals X, Y the rotation angle value by means of a function saved in the evaluation unit, characterized in that for a plurality of predetermined values of one of the output signals X or Y associated ideal values calculated from the geometrical relationship of the sensors of the other output signal Y, X are saved in the evaluation unit, the measured values of the other output signal Y, X are compared with the ideal values and a warning or stop signal is created if the difference between the measured and ideal value reaches a predetermined amount.

5 Claims, 1 Drawing Sheet

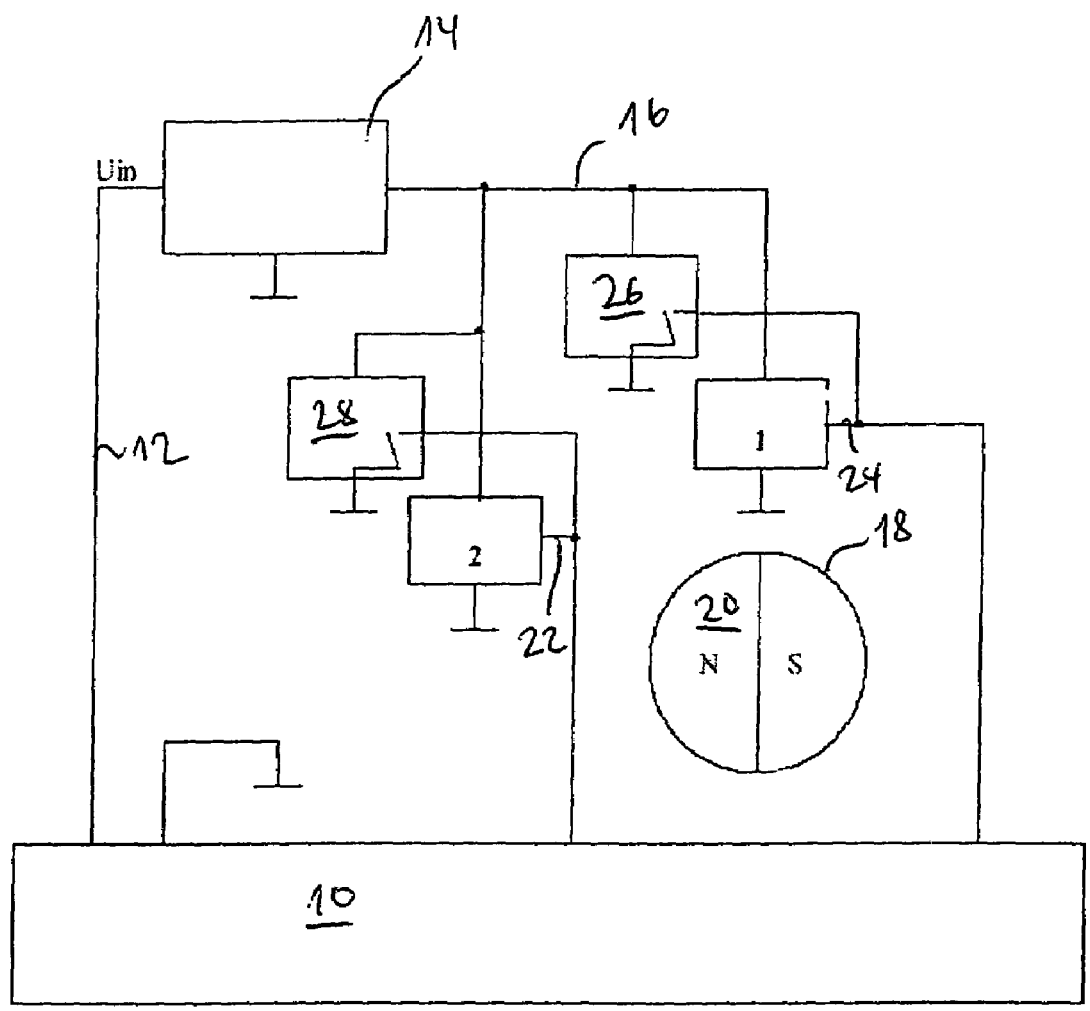

ROTATION ANGLE SENSOR, IN PARTICULAR FOR AN ELECTRICAL STEERING SYSTEM OF AN INDUSTRIAL TRUCK

CROSS-REFERENCE TO RELATED APPLICATIONS

Not applicable.

STATEMENT REGARDING FEDERALLY SPONSORED RESEARCH

Not applicable.

BACKGROUND OF THE INVENTION

It is known to provide industrial trucks and other vehicles with an electrical steering system. The rotation of a steering transmitter is measured with the help of a rotation angle sensor and the rotation angle signal is given to an actuator, which depending on the measured rotation angle creates a steering angle for a wheel to be steered. For these types of electrical steering systems as well as for other applications, the security in the angle capture is of importance. A failure of the electrical steering system or a wrong angle display can have uncomfortable consequences if not detected in a timely manner.

It is known to determine a rotation angle with the help of an electrical potentiometer. It is also known to determine an angle of rotation in that two magnetic field sensitive orthogonally arranged sensor elements, e.g. hall sensors, work together with one permanent magnet, which is e.g. arranged on the shaft of the steering transmitter. The sensor elements create sinusoidal output signals depending on the rotary motion of the magnet [$X = A \cdot \cos(\Theta) + B$ und $Y = A \cdot \sin(\Theta) + B$]. With the help of a formula saved in an evaluation unit, e.g. $\Theta = \alpha \tan 2(Y-B, X-B)$, a rotation angle is calculated in a processor and processed further. The rotation angle can be determined relatively exactly with this type of rotation angle sensor. It is disadvantageous that errors, which are caused by the failure of a sensor element, e.g. due to a wire break or the appearance of impermissible drift phenomena, such as static external magnetic fields, are not detected right away under some circumstances.

The object of the invention is to create a rotation angle sensor, in particular for electrical steering systems for industrial trucks, which is monitored for failures.

BRIEF SUMMARY OF THE INVENTION

The invention determines the associated ideal output signals of the second sensor for output signals of a sensor, i.e. from the geometric relationships of the sensors with each other. The ideal values are saved and are set opposite each of the measured values. If they match, there is no measurement error. If this is not the case, there may be a measurement error, which requires taking appropriate action in terms of the operation of the vehicle.

In one possible embodiment of the invention, redundant rotation angles are determined from the sensor signals X, Y in accordance with the below formulas:

$$\Theta_{redundant,1} = \arcsin\left(\frac{Y-B}{A}\right)$$

$$\Theta_{redundant,2} = \arccos\left(\frac{X-B}{A}\right)$$

In these formulas, A is the amplitude and B is the offset for the output signals Y and X. An offset B is established in order to always receive positive values. The redundant rotation angles are related to each other. If the absolute value of the difference of the redundant rotation angles exceeds a predetermined value, a corresponding signal is created, e.g. a warning or stop signal for the vehicle. Then the identified deviation indicates that at least one sensor element is not working reliably or is subject to an impermissible drift.

In the alternative embodiment in accordance with an embodiment of the invention, the formula $$|(X-B)^2 + (Y-B)^2 - A^2|$$

is used to determine result $\epsilon$, wherein X and Y, as already specified, represent the output signals, i.e. the voltage at the output of the sensor elements, A the amplitude of the output signals and B the aforementioned offset. If result $\epsilon$ exceeds a predetermined value, a warning or stop signal is in turn created.

The invention provides security in the case of the failure or malfunction of one or both sensor elements so that assistance is obtained in a timely manner or the vehicle can be stopped, if necessary. The invention is advantageous in that simple mathematical principles can be used, i.e. with the help of an already existing processor, to obtain redundant results, which enable a review of the angle values identified by another function. Additional instrumental effort for this safety review during the rotation angle determination is not required.

In accordance with one embodiment of the invention, it is advantageous to determine the redundant angle values in predetermined time intervals (sample rate T), in order to e.g. determine a drift of the output signals. If the rotation angle values between two sampling intervals exceed a predetermined change value, an alarm or stop signal e.g. can in turn be created.

In another embodiment of the invention, a voltage monitoring unit is connected to the output of each of the sensor elements, which determines whether the output signals X, Y lie outside a predetermined voltage band. The output of the sensor element is set to the zero potential, if an output signal lies outside the voltage band.

The invention is explained in greater detail below using a drawing.

BRIEF DESCRIPTION OF THE DRAWING

FIG. 1 shows a block diagram of a rotation angle sensor in accordance with the invention.

DETAILED DESCRIPTION OF THE INVENTION

While this invention may be embodied in many different forms, there are described in detail herein a specific preferred embodiment of the invention. This description is an exemplification of the principles of the invention and is not intended to limit the invention to the particular embodiment illustrated.

A first sensor element 1 and a second sensor element 2 are supplied with power by a terminal strip 10 via a line 12, a controller 14 and a line 16. These are e.g. hall elements, the axes of which lie orthogonal to each other, wherein through the intersection point of the axes extends the rotation axis of a shaft 18, on which a permanent magnet 20 is arranged (can be identified on the N and S poles). When rotating the permanent magnet 20 around the rotation axis, sinusoidal voltages are created at the outputs 22 or 24 of the sensor elements 1, 2. The respective rotation angle is determined from the voltage values Y, X e.g. according to the formula arc tan 2(Y−B, X−B). The evaluation occurs in a processor, which is not shown in greater detail. Moreover, the output signals of the sensor elements 1, 2 are further evaluated mathematically, in order to check the accuracy of the rotation angle measurement. This has already been explained above.

Voltage monitoring units 26, 28 are connected with the voltage supply lines leading to the sensor elements 1, 2. They place the output 22 or 24 of the sensor elements 1, 2 on the zero potential, if it is determined that an output voltage does not lie within a predetermined band. It can thus be determined whether e.g. a wire break or another error is present. Moreover, the aversion of the supply voltage outside a triangle of 4.6 to 5.4 volts leads to an impermissible migration of the output signal of the sensor elements 1, 2.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

What is claimed is:

1. Rotation angle sensor, in particular for an electrical steering system of an industrial truck, comprising:
   two magnetic field sensor elements,
   a permanent magnet,
   a shaft,
   an evaluation unit, and
   a voltage monitoring unit, wherein:
the two magnetic field sensitive sensor elements are arranged on orthogonal axes and the permanent magnet is attached to the shaft extending through the axis intersection point and the output signals X, Y of the sensor elements are given to the evaluation unit, which determines from the two output signals X, Y the rotation angle value by means of a function saved in the evaluation unit, characterized in that for a plurality of predetermined values of one of the output signals X or Y associated ideal values calculated from the geometrical relationship of the sensors (1, 2) of the other output signal Y, X are saved in the evaluation unit (10), the measured values of the other output signal Y, X are compared with the ideal values and a warning or stop signal is created if the difference between the measured and ideal value reaches a predetermined amount, the voltage monitoring unit is connected to the output of each of the sensor elements, which determines whether the voltage supply adjacent to the sensor elements lies within a predetermined voltage band and the output of a sensor element is set to the zero potential if the supply voltage of the sensor element lies outside the predetermined voltage band.

2. Rotation angle sensor in accordance with claim 1, in which two magnetic field sensitive sensor elements are arranged on orthogonal axes and a permanent magnet is attached to a shaft extending through the axis intersection point and the output signals X, Y of the sensor elements are given to an evaluation unit, which determines from the two output signals X, Y the rotation angle value by means of a function saved in the evaluation unit, characterized in that, according to the formula:

$$\Theta_{redundant,1} = \arcsin\left(\frac{Y-B}{A}\right)$$
$$\Theta_{redundant,2} = \arccos\left(\frac{X-B}{A}\right)$$

redundant rotation angle values $\Theta_{red.\ 1}$ and $\Theta_{red.\ 2}$ are identified from the sensor signals X, Y in the evaluation unit, wherein A is the amplitude and B is the offset of the output signals and a warning or stop signal is created if the absolute value of the difference of the redundant rotation angle values $\Theta_{red.\ 1}$ and $\Theta_{red.\ 2}$ exceeds a predetermined value.

3. Rotation angle sensor in accordance with claim 1, in which two magnetic field sensitive sensor elements are arranged on orthogonal axes and a permanent magnet is attached to a shaft extending through the axis intersection point and the output signals X, Y of the sensor elements are given to an evaluation unit, which determines from the two output signals X, Y the rotation angle value by means of a function saved in the evaluation unit, characterized in that the result is formed in the evaluation unit according to the formula:

$$|(X-B)^2+(Y-B)^2-A^2|,$$

wherein X and Y are the output signals, A is the amplitude and B is the offset of the output signals X, Y, the result $\epsilon$ is compared with a predetermined value and a warning or stop signal is created if the predetermined value is exceeded.

4. Rotation angle sensor in accordance with claim 1, characterized in that the stop signal for the drive motor of an industrial truck is created.

5. Rotation angle sensor, in particular for an electrical steering system of an industrial truck, in which two magnetic field sensitive sensor elements are arranged on orthogonal axes and a permanent magnet is attached to a shaft extending through the axis intersection point and the output signals X, Y of the sensor elements are given to an evaluation unit, which determines from the two output signals X, Y the rotation angle value by means of a function saved in the evaluation unit, characterized in that for a plurality of predetermined values of one of the output signals X or Y associated ideal values calculated from the geometrical relationship of the sensors of the other output signal Y, X are saved in the evaluation unit, the measured values of the other output signal Y, X are compared with the ideal values and a warning or stop signal is created if the difference between the measured and ideal value reaches a predetermined amount, the function saved in the evaluation unit is characterized according to the formula:

$$\Theta_{redundant,1} = \arcsin\left(\frac{Y-B}{A}\right)$$

$$\Theta_{redundant,2} = \arccos\left(\frac{X-B}{A}\right)$$

redundant rotation angle values $\Theta_{red.\ 1}$ and $\Theta_{red.\ 2}$ are identified from the sensor signals X, Y in the evaluation unit, wherein A is the amplitude and B is the offset of the output signals and a warning or stop signal is created if the absolute value of the difference of the redundant rotation angle values $\Theta_{red.\ 1}$ and $\Theta_{red.\ 2}$ exceeds a predetermined value, the calculation of the redundant rotation angle values or the result $\epsilon$ occurs with a predetermined sample rate T and an alarm or stop signal is created if the rotation angle values measured between two sample values or the result $\epsilon$ deviates from a predetermined change value $\Delta\Phi$ or $\Delta\epsilon$.

* * * * *